United States Patent [19]

Rosenberg

[11] Patent Number: 5,080,479
[45] Date of Patent: Jan. 14, 1992

[54] AUTOMATIC IMPLANTING OF IDENTIFICATION DATA IN ANY RECORDED MEDIUM

[76] Inventor: Stanley L. Rosenberg, 500 E. 77 St., New York, N.Y. 10021

[21] Appl. No.: 559,691

[22] Filed: Jul. 30, 1990

[51] Int. Cl.⁵ .............................................. G03B 21/50
[52] U.S. Cl. ...................................... 352/92; 352/236; 355/40
[58] Field of Search ................... 352/92, 236; 355/40, 355/123

[56] References Cited

U.S. PATENT DOCUMENTS

| | | | |
|---|---|---|---|
| 1,704,124 | 3/1929 | Fiedler | 352/236 |
| 3,309,163 | 3/1967 | White | 352/92 |
| 3,576,369 | 4/1971 | Wick et al. | 352/236 |
| 3,845,391 | 10/1974 | Crosby | |
| 4,393,277 | 7/1983 | Besen et al. | |
| 4,659,213 | 4/1987 | Matsumoto | 355/40 |
| 4,670,890 | 6/1987 | Titchener | |
| 4,703,476 | 10/1987 | Howard | |
| 4,720,860 | 1/1988 | Weiss | |
| 4,782,366 | 11/1988 | Lindsay | 355/40 |
| 4,823,162 | 4/1989 | Renn et al. | 355/40 |

Primary Examiner—Monroe H. Hayes

[57] ABSTRACT

A method of using only the audio track, for automatically implanting (in both forward and reverse printing) sequential identification film numbers as an integral part of the film, (both new and existing), with no change to the film or printing process and which is unnoticed by the viewer or listener. Any copy (direct print or broadcast) of such film will bear the exact same traceable identification number. The many applications comprise: proof of broadcast and cable transmission for programs and commercials; royalty data:movies, juke boxes, etc.; residuals data for musicians and actors; apprehension of illegal copiers.

8 Claims, 12 Drawing Sheets

AURAL SENSITIVITY CURVES

NORMALIZED LOW-PASS RESPONSE
TSCHEBYSCHEFF 0.1 db RIPPLE

AUTOMATIC IMPLANTING OF IDENTIFICATION DATA IN ANY RECORDED MEDIUM

BACKGROUND OF THE INVENTION

This invention relates in general to a means and apparatus for placing a unique serial or identification number on each film or tape copied and more particularly to a means of automatically transfering said identification to unauthorized copies (unnoticed) so as to improve the ability to apprehend the unauthorized copiers of movies and tapes; records and other recorded media.

The movie industry has suffered considerable financial loss due to illegal copying of films and video tapes. One of the problems in this connection is the difficulty in tracing the source that enables the copies to be made. No system has been developed that would satisfactorily give each copy a unique non-erasable identification number automatically. This invention is a means for automatically placing a unique identification number in each film print and other recorded media and also the implanting in all illegal copies the same identification number as the source from which they were copied.

There are a number of systems that have been developed and proposed for transmitting auxiliary information along with the main program being broadcast. Superaudible and subaudible transmission has been used in prior art for achieving such multiplexing of an allocated broadcast channel. Known techniques are not particularly well adapted to the transmission of unobtrusive coding signals for identifying and verifying the transmission of a particular program.

In general the known and proposed techniques employ an unacceptably large portion of the program channel. In particular there is too much interference with the program material. Prior methods of locating markers on film were usually hand made by cutting out an edge; crayon marks; white paint on edge; subaudible cue tones (as used to advance slides; alert for end of tape) At times some of these methods result in damage to the film and have to be hand applied. A more recent identification technique; a pattern recognition system which requires placing in a memory bank the pattern of each and every program and commercial, which, when received, has to be compared with all the patterns in the memory bank to recognize the "match" of the program pattern. Human effort is still required to capture the pattern when it is first broadcast. Further, this system has difficulty in distinguishing nationally used commercials from the local versions, which are identical except for a local message at the end of the broadcast. The system tends to report a local broadcast as a national one. In any case they do not provide a means of automatically placing unique identification numbers on film.

Whatever the precise merits, features and advantages of the above cited references none achieves or fulfills the purposes of the present invention. Accordingly, it is a major purpose of this invention to provide a means of automatically placing in each program its own unique identification number. In particular it is an important purpose of this invention to provide a program identification technique that is unheard by the listener and unseen by the viewer.

It is further a purpose of this invention that each identification be an integral part of the film or magnetic tape itself. It is also a purpose of this invention that the said identification number be undetectable by unauthorized copiers. It is an additional purpose of this invention that any unauthorized copy of a legal or illegal film have the same identification number as the film from which it was made transferred to it. It is a further purpose of this invention that unique ID numbers be given to authorized copies sequentially in its normal process without any special treatment.

It is a further purpose of this invention to provide a means of identifying a film or magnetic tape so that the information contained in the coding can be decoded from either the film or tape directly.

It is a further purpose of this invention to provide a means of identifying and detecting broadcast transmissions comprising AM & FM radio stations; TV stations; cable systems; juke box records; etc.

BRIEF DESCRIPTION OF THE INVENTION

In brief, one of the most important applications contemplated for this invention is the automatic placement of an inaudible, invisible sequential identification number on each film print made in such a manner that if any unauthorized (pirated) copy is made, this unique identification number will be transferred to the pirated copy, thus permitting the tracing of the legitimate print. This will help apprehend the illegal copiers (pirates) and thus discourage the making of illegal film copies.

The method of accomplishing the above can also be used for the further purpose of detecting and identifying film or magnetic tape programs that are broadcast over AM & FM radio, TV and cable stations and others, thus providing the additional use of the proof of transmission for accurate records for the determination of any royalties due for the use of the films; residual fees for actors and musicians; royalties; automatic monitoring of line-ups (AMOL) as well as juke box plays for royalty purposes. This invention does not use any of the television retrace lines or the vertical interval as are used in other systems. Further, both new and existing films can use this invention to accomplish the above. Preparation of the film negative for use with this invention is done only once and there are no physical or chemical changes to the film or magnetic tape. The procedures used in normal operations for print runs remain exactly the same and no changes are necessary.

The principle used to accomplish the actions of this invention is as follows: The unique identification number is numerically the same number (or proportionate to) as the length of film (or elapsed time) passed, measured in various intervals comprising seconds, minutes, feet, frames, perforations, bar code groups, etc. This is the distance between two points (at least one of which is invisible and inaudible). Therefore, since the location of this marker is not known by unauthorized personnel, they cannot determine the distance between the two points.

This distance is changed automatically when each print run is made from the legitimate negative to which an initial identification number is assigned. For example: if the first identification number assignment is 1347, the first copy will bear this same identification number in undetectible form. The second copy will bear the number 1348. The identification number will change by plus one for each pass (forward and reverse) of the negative. If desired, each reel can be given its own unique sequential number series.

Figure 10A:
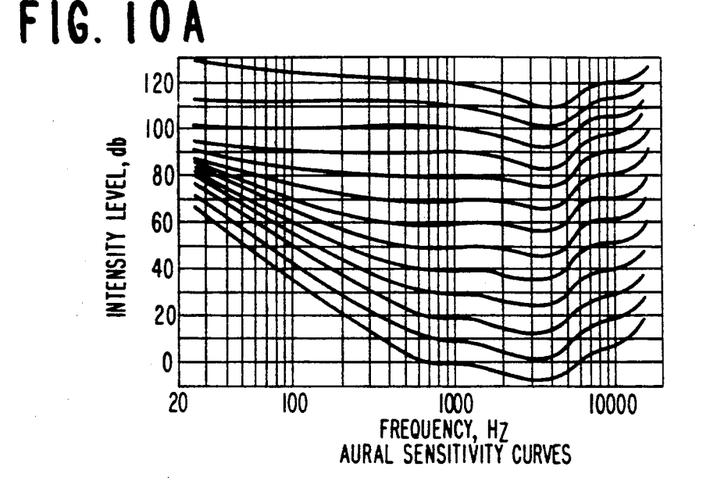
Figure 10B:
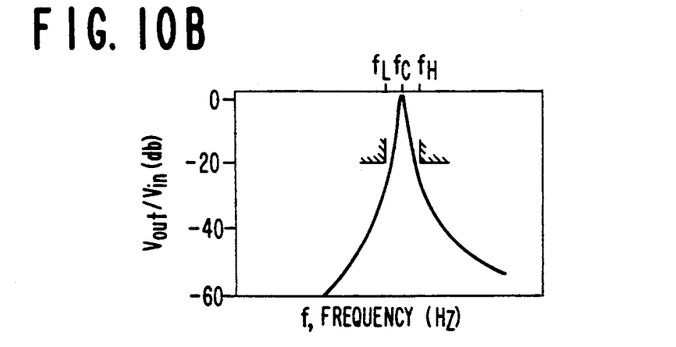
Figure 10C:
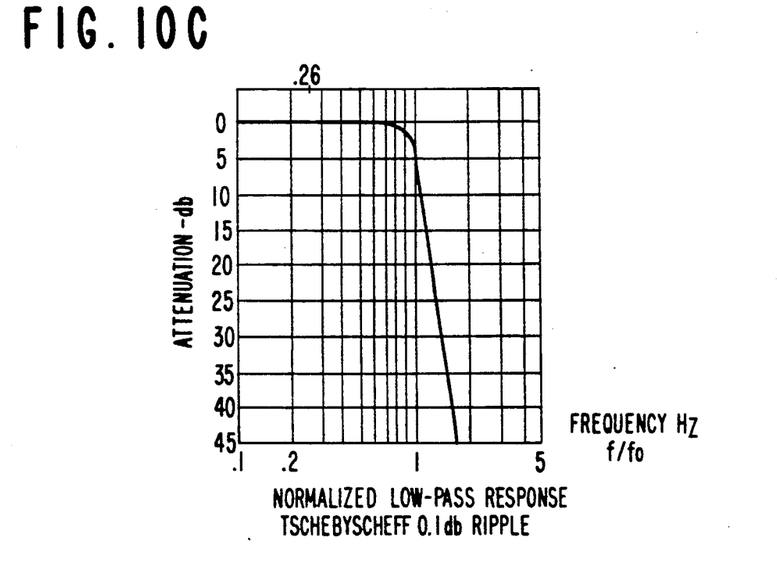

The location markers (only in the audio track) are sources of 26 Hz burst. 26 Hz is below the range of hearing of the human ear. FIG. 10 shows the well known Fletcher curves of equal sensitivity for average hearing, which shows that at the 10 Db level the sensitivity of the ear at 26 Hz is minus 62 Db below the sensitivity of the ear at 1000 Hz. This shows the 26 Hz to be inaudible. Since only the audio track is used in this invention, the bursts from the mixed magnetic tape audio track do not utilize anything visual. The 26 Hz light markers will not be noticed visually due to the image retentivity characteristic of the human eye. This invention can also provide a means for greatly reducing the encoding and decoding times.

The invention will be best understood when read in conjunction with the accompanying drawings.

BRIEF DESCRIPTION OF THE DRAWINGS

FIGS. 10A-10C show the sensitivity curves that show the hearing sensitivity at 26 Hz to be minus 62 Db as compared to 1000 Hz. Shown also are band pass filter curves that show how very narrow its pass band is, thus allowing virtually pure 26 Hz to pass through.

LIST OF REFERENCE NUMERALS

| Ref. # | Description | Used in FIG. |
| --- | --- | --- |
| 1 | Magnetic tape playback unit | 1 |
| 2 | 26Hz source | 1,5,12 |
| 3 | Timer | 1,5,12 |
| 3a | Audio (earphone) output | 1,5 |
| 4 | Mixer | 1 |
| 5 | Optical record head | 1 |
| 6 | Optical audio track | 1,2,3,6,7,8,9 |
| 7a | 26Hz before first frame | 1,2,3,6,7,8,9 |
| 7b | 26Hz burst random distance after first frame | 1,2,3,6,8,9,12 |
| 7c | 26Hz burst after last frame | 1,2,3,6,9 |
| 8 | Random distance of 7b from 9a (fixed for each run) | 1,2,6,8,9 |
| 9a | Synchronizing section of head leader | 1,2,3,6,8,9 |
| 9b | Opaque runout section of tail leader | 1,2,3,6 |
| 10 | Frames (for counting) | 2,6 |
| 11 | Location of start of counting in forward direction | 2,6,12 |
| 12 | Preset progression counter | 2,6,7,8,9,11 |
| 13 | Contact closure when preset is reached (for end marker) | 2,5,6,7,8,9,11,12 |
| 14 | Negative film | 1,2,3,6,7,8 |
| 15 | 26Hz detector (see FIG. 3) | 2,3,6,7,8,9,12 |
| 16 | Location of start of reverse run countdown | 1,2,6 |
| 17 | First frame | 1,2,6 |
| 18 | Last frame | 1,2,6 |
| 19 | Tail leader | 1,2,6 |
| 20 | Head leader | 1,2,6 |
| 21 | Frame (or other interval) reader | 2,6,7,8,9,11 |
| 22 | Location marker | 2,3,6,7,8,9 |
| 23 | 26Hz detector contact closure | 2,3,5,6,7,8,9,12 |
| 24 | Edge light | 5 |
| 25 | Projector lamp filament | 5 |
| 26 | Optical track reader | 3 |
| 27 | 26Hz band pass filter (see FIG. 10) | 3,11 |
| 28 | Wave shaper | 1,3 |
| 29 | Light-end marker system (see FIG. 5) | 3,5,6,7 |
| 30 | Amplifier | 5 |
| 31 | Location of marker when preset number is reached | 6,9,12 |
| 32 | Two frame counter sitch | 7 |
| 33 | Two frame counter | 7 |
| 34 | Light-end marker system switch | 5 |
| 35 | Two frame counter power switch | 7 |
| 36 | Marker location switch | 1,5 |

DETAILED DESCRIPTION OF THE INVENTION

A general discussion of the invention and its preferred embodiment will be presented first followed by detailed references to the drawings and the operations and procedures prescribed. One of the most important applications of this invention is its capability of implanting unique identification numbers as an integral part of the film. Here the concept of having the numerical value of the number of units of measurement (feet, frames, etc.) between two points (markers) on the film be the same numerically as the identification number, is utilized. For example: if the unit of measurement chosen is a frame, and the number of frames between the two markers is 1374, then the identification number of that film is 1374. This invention comprises the means for implanting the location markers in such a manner that they are inaudible and invisible. Further the markers are implanted so that illegal copies made from both legal and illegal prints will also have these same markers in the exact same locations. This allows the source of copies to be traced. The invention also comprises the method and apparatus of automatically implanting the markers so that, starting with the initial assigned identification number, each print will have its own unique sequential number. No physical or chemical changes to the film, or changes in procedure are needed. Additional ramifications are also described.

Figure 1:
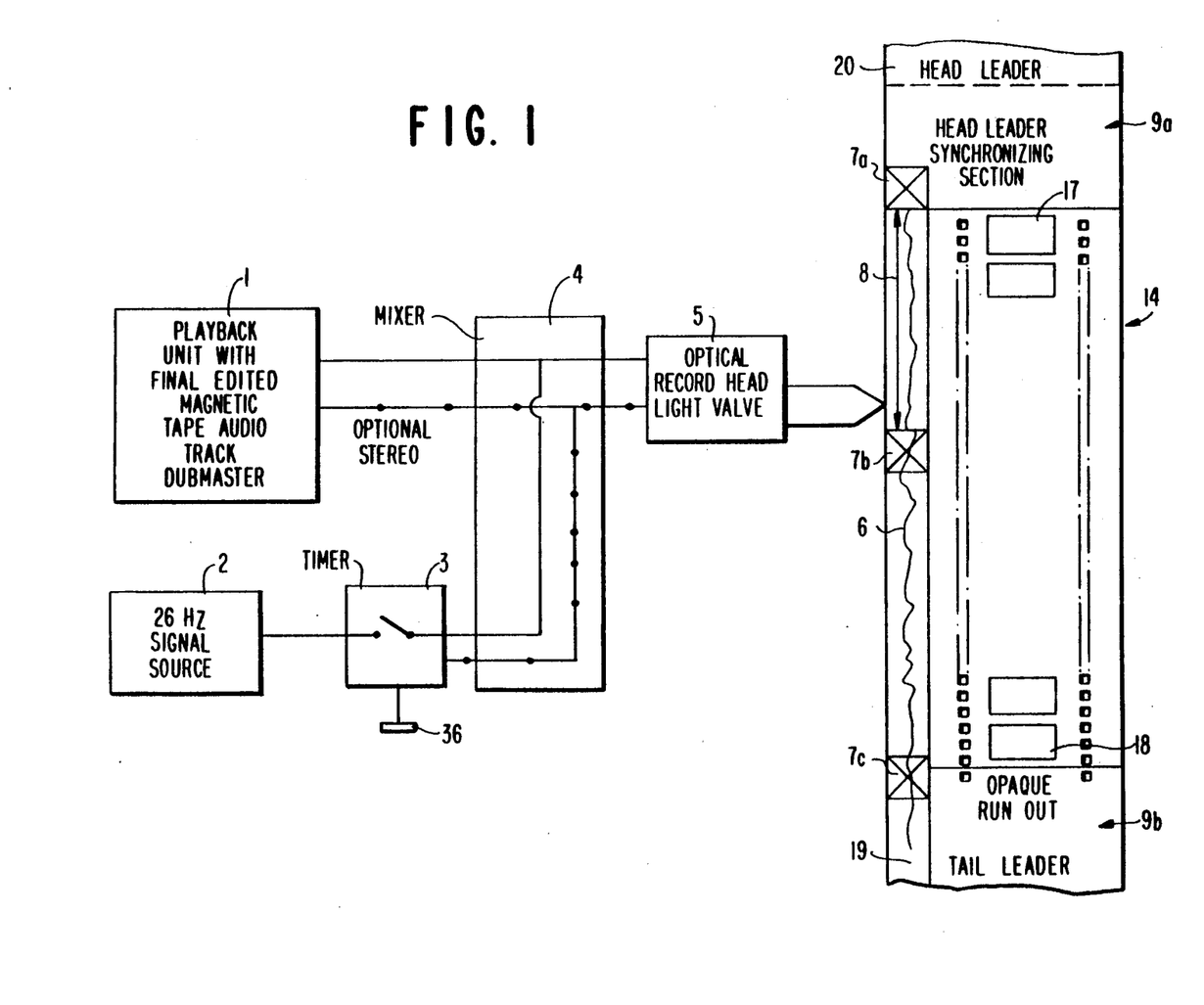
FIG. 1 is a block diagram showing the means by which the desired location markers are placed in the optical track of the preferred embodiment.

The invention can be better understood by reference to the drawings. A normal procedure for making the optical sound track on a film is to first have the sound track recorded on magnetic tape, and then transfer the final edited dubmaster to the negative. FIG. 1 shows the block diagram of the one time preparation of a new film negative. At the same time that the final edited sound track is being transferred via optical head (5) to the negative (14) in its normal manner by means of playback unit (1), a 26 Hz signal, derived from its source (2), is combined by means of the audio mixer (4) so that the combined signal is fed through the optical record head light valve (5) to the optical sound track (6). The duration of the 26 Hz burst is controlled by the timer (3). The timer is activated by switch (36) so as to place these bursts (markers) at the following locations as the film is run through: (7a) (used only for automatic stop and shuttling) is placed immediately prior to the first film frame (17) of the film (14); (7b) is placed at a random distance (8) after frame 1 (17) and this distance remains constant for each print in the run.; and (7c)-immediately after the last frame (18). This is in the opaque run out area (9b) of the tail leader (19). A unique identification number is assigned to the negative and its first copy.

Figure 2:
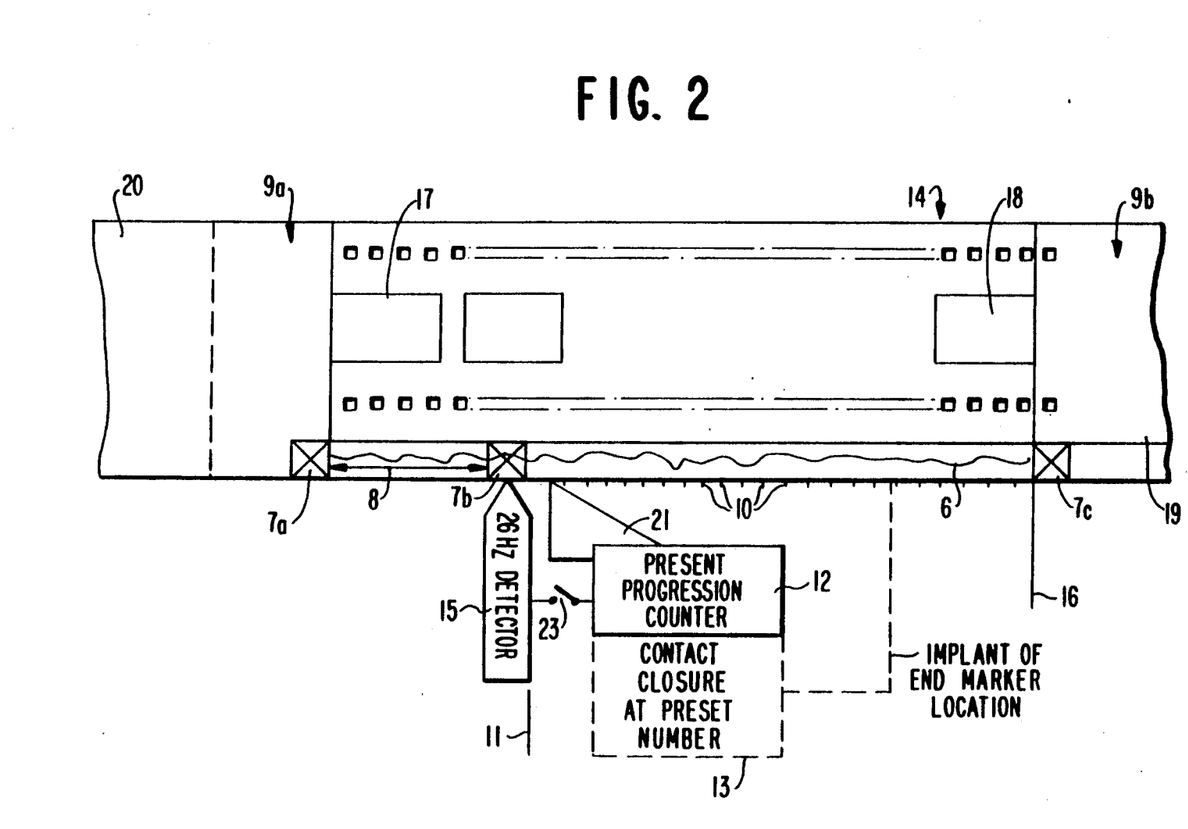
FIG. 2 illustrates the condition of the film negative at the start of a printing run of a new film.

FIG. 2 shows the condition of the negative prior to the start of the copying process. The 26 Hz bursts are in place as described in FIG. 1. The 26 Hz detector (15) (see FIG. 3) is activated when the film moves the 26 Hz burst (7b) post detector (15). When the detector is activated, it starts the counter (12) reading the frames (10) as the film passes the frame reader (21). The means by which each pass is given its own sequential identification number is described in FIG. 4.

Figure 3:
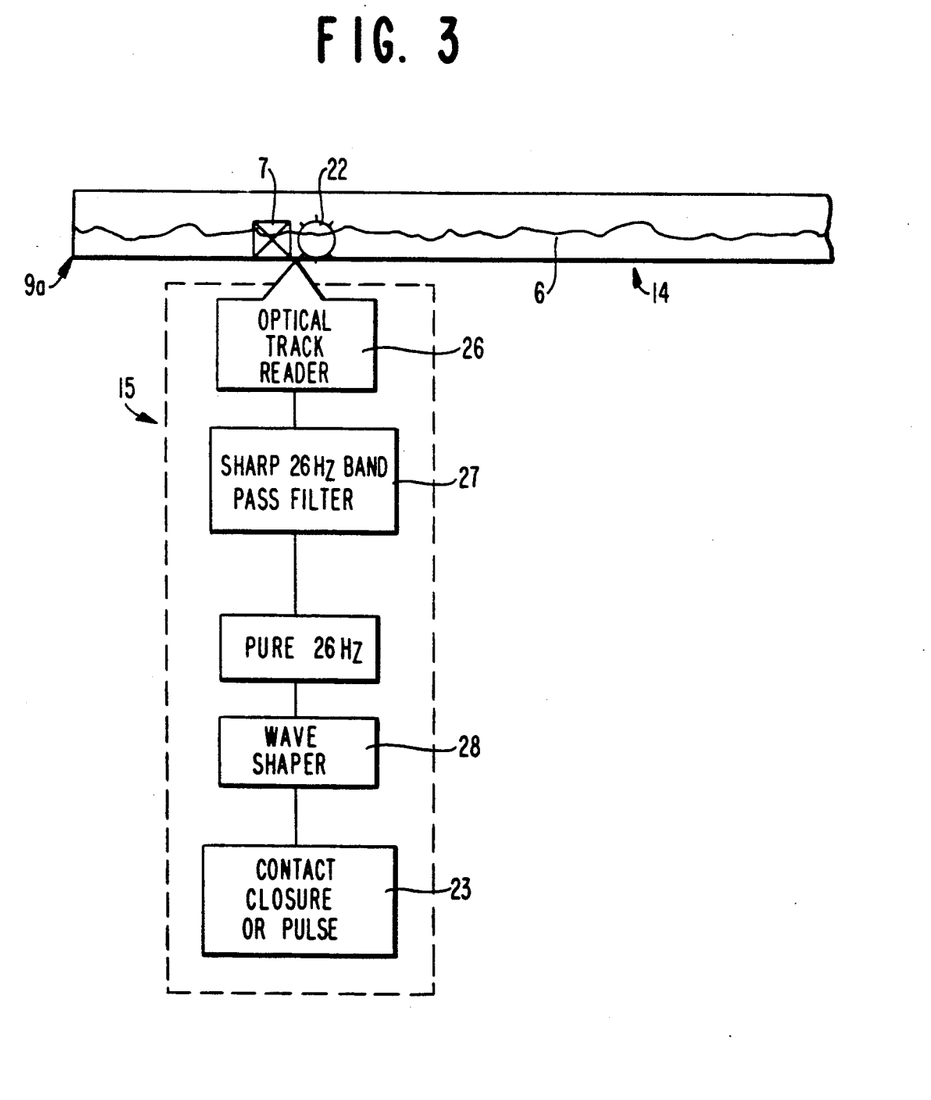
FIG. 3 is a block diagram of a system that detects the 26 Hz signal from the content of the optical sound track.

FIG. 3 describes the operation of the 26 Hz detector. When the film passes by the optical sound track reader (26) it receives the total audio content of the track (6). The total audio is passed to the very sharp 26 Hz band pass or low pass filter (27) which extracts the pure 26 Hz signal. If it is desired, 26 Hz signal can be shaped (28) (to a pulse or square wave) and amplified so as to best obtain the contact closing (23).

Figure 4:
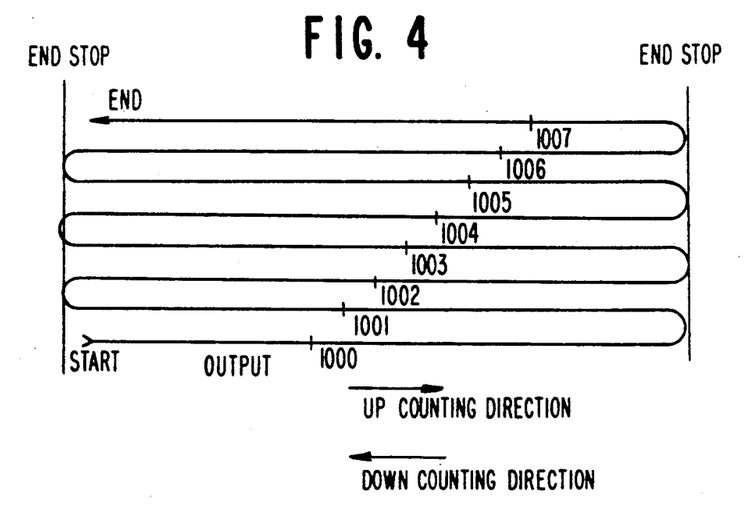
FIG. 4 explains how the preset progression counter advances the location of the end marker by one so as to number the identification numbers sequentially.
Figure 5:
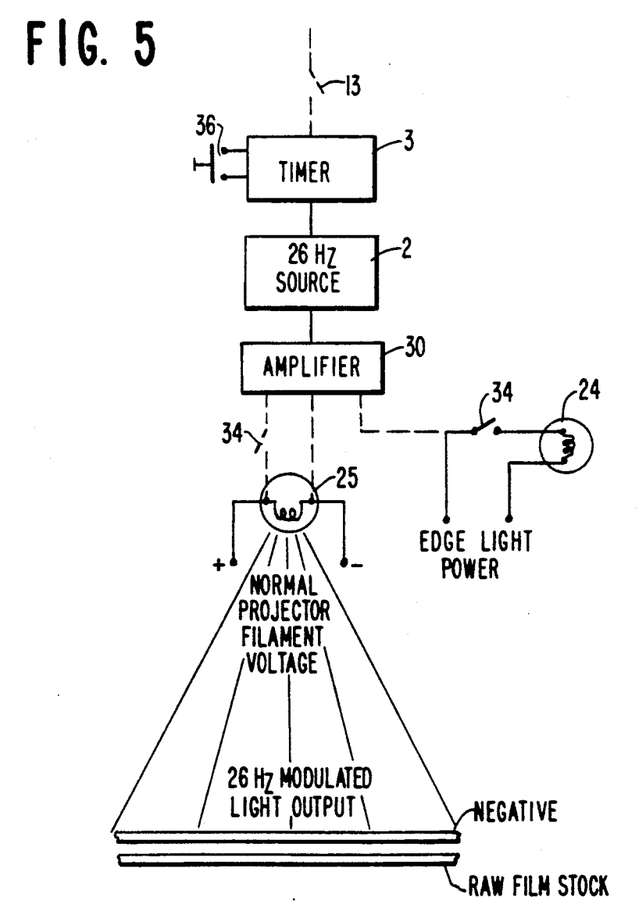
FIG. 5 is a block diagram showing a means of producing a 26 Hz signal which serves to act as a location marker for films. Two methods of using a light to accomplish this are shown. The projector lamp filament will have an output modulated by the 26 Hz varying voltage of the filament. The edge light when turned on creates a location marker at the point determined by the identification number.
Figure 6A:
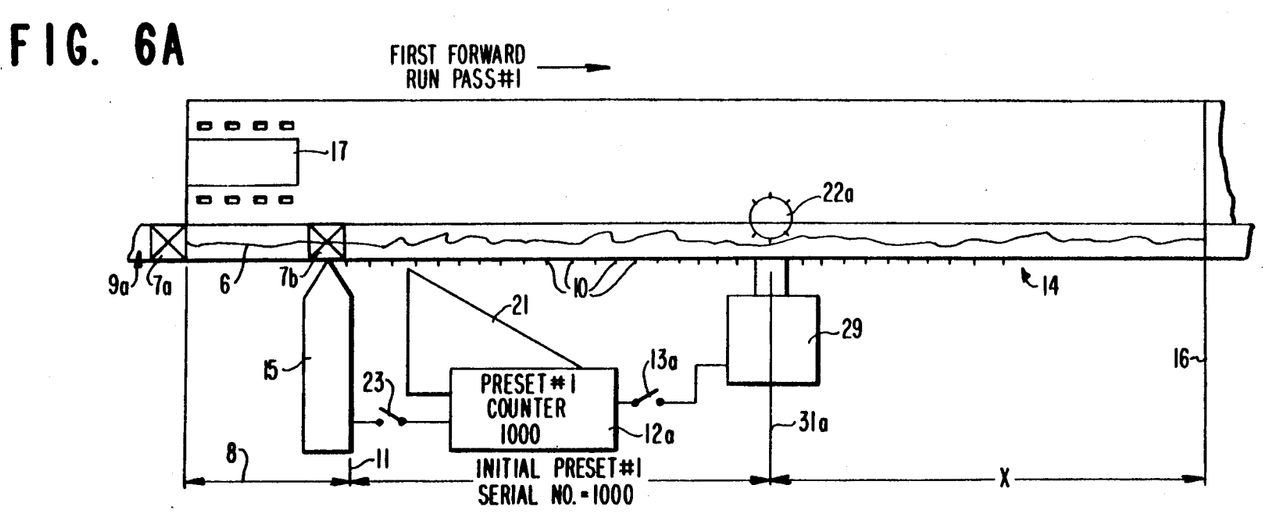
FIGS. 6A-6D show a system and the steps taken to implant sequential identification numbers in the preferred embodiment. This encoding of the identification number is done in both the forward and reverse directions.
Figure 6B:
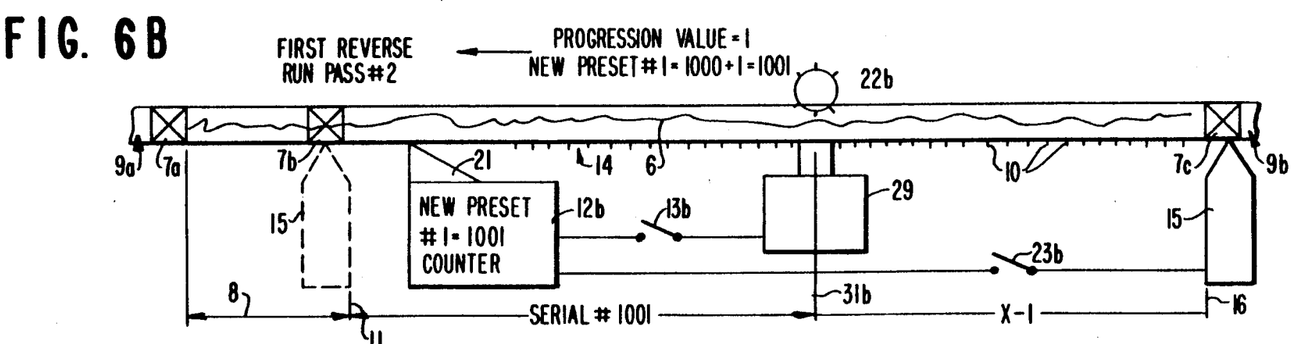
Figure 6C:
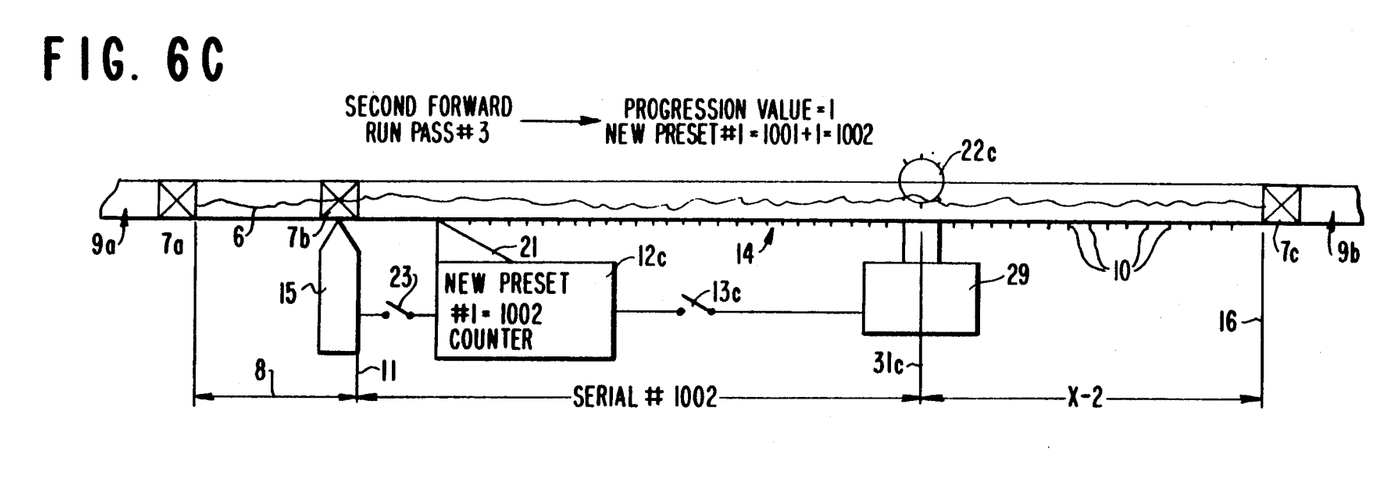
Figure 6D:
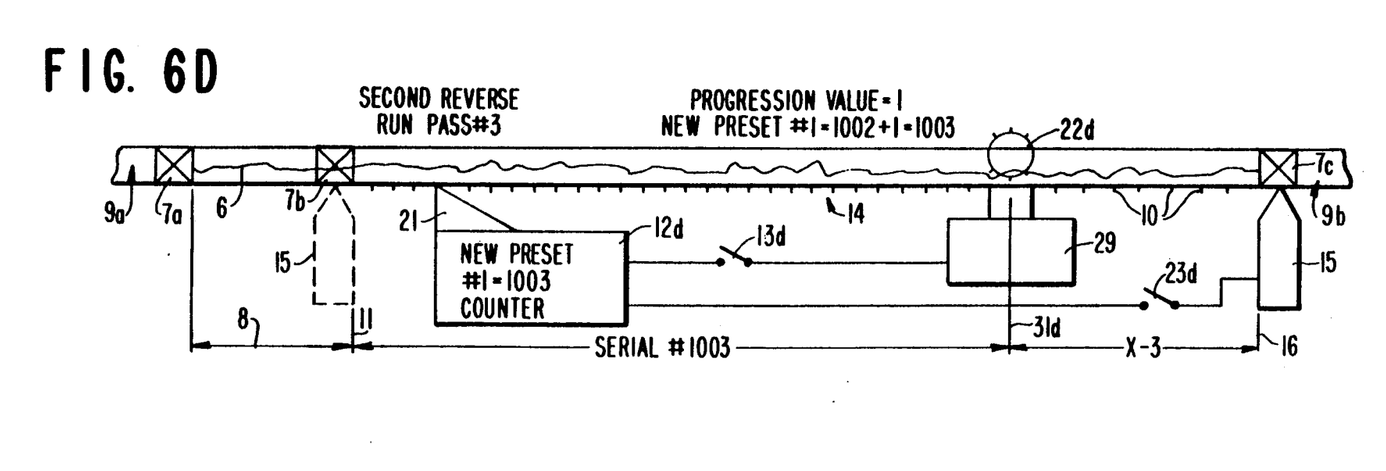

FIG. 4—Explains the means by which each pass results in the increasing of the identification number by one. FIG. 5 describes the means of locating a marker which appears not only on the copy being printed, but will also appear on each copy made from this copy. Switch (13) is closed when the preset counter (12) reaches its preset amount. This turns on the timer (3) which turns on the 26 Hz source (2). The 26 Hz signal is amplified (30) as needed. Two types of markers are shown; either may be chosen as determined by the printing equipment. In the preferred embodiment the 26 Hz signal across the filament of the projector lamp modulates its light output. This mixes the 26 Hz with the normal optical light coming through the optical negative sound track. If an edge light is available on the printer, it may be used as a marker by turning it on at the desired location, through switch 34.

THE ENCODER

FIG. 6 describes the process of placing sequential identification numbers on each print by increasing each print by one above the preceding identification number (see FIG. 4). Place the first preset assigned identification number into the counter (12). In the first forward run (pass #1), the film (14) is moved in accordance with its normal procedure. As the film (14) moves forward, burst (7a) is ignored. When the film (14) moves burst (7b), (beginning mark) (which remains fixed for the entire run at the distance (8)) from the first frame (17) past its detector (15), it reads the 26 Hz through the optical track reader (26). (see FIG. 3). This results in closing contact (23) which starts the counter (12a) counting the amount of frames (10) (interval units) which pass the reader (21). When the counted amount of frames (interval units) equals the preset# display (which in this example is 1000) (identification mark), the counter closes switch (13a) which turns on the light marker system (29). (See FIG. 5) which produces marker (22a) (ending mark) at location (31a). The numerical count of the number of frames (10) (interval units) between the location of burst (7b) (beginning mark) and the location marker (22a) (ending mark) is 1000 (in this example), therefore, the identification number of the first copy is 1000 (identification mark). The counter (12a) continues to count frames until burst (7c) location (16) is reached (distance=X). The location of (7c) is in the opaque runout area (9b) in which there are no frames and therefore the counter stops counting; it then shuts itself off and reverses its counting direction for a count down. In the FIRST REVERSE RUN (PASS #2), the progression value (one) is added to the previous preset #1 identification number so that the next preset (#1) is 1001. (See FIG. 4). When the film passes burst (7c), detector (15) contact (23b) is closed, which starts counter (12b). When the countdown reaches (X-1), the new preset #1 (1001) (identification mark) is reached, closing contact (13b), which causes the light marker system (29) to make marker (22b) (ending mark) at location (31b). The counter shuts itself off, and reverses its counting direction to count up. In the SECOND FORWARD RUN (pass #3), the progression value (one) is added to the preset #1, making the new preset #1 to be 1002. As in pass #1, the counter (12c) is started by detector (15) when burst (7b) (beginning mark) passes. Contact closure (23) turns on counter (12c). When 1002 frames have been counted (through reader (21)), the preset #1002 (identification mark) is reached, causing contact closure (13c) to turn on light marker system (29), which makes marker (22c) (ending mark) at location (31c). The counter continues counting to the end of the film at location (16) at which time the counter stops; turns itself off, and reverses counting direction to count down. In the 2nd REVERSE RUN (PASS 4), the progression value, one, is added to make the new preset #1003 (identification mark). The procedure is identical to the first reverse run (pass #2).

The procedure is continued for as many runs as desired (totalled by relay #3), with the identification number increased by one on each run.

ALTERNATIVE MEANS OF COUNTING WHICH REDUCES ENCODING TIME

It is sometimes desirable to reduce the time necessary to encode or decode the film identification number.

Figure 7:
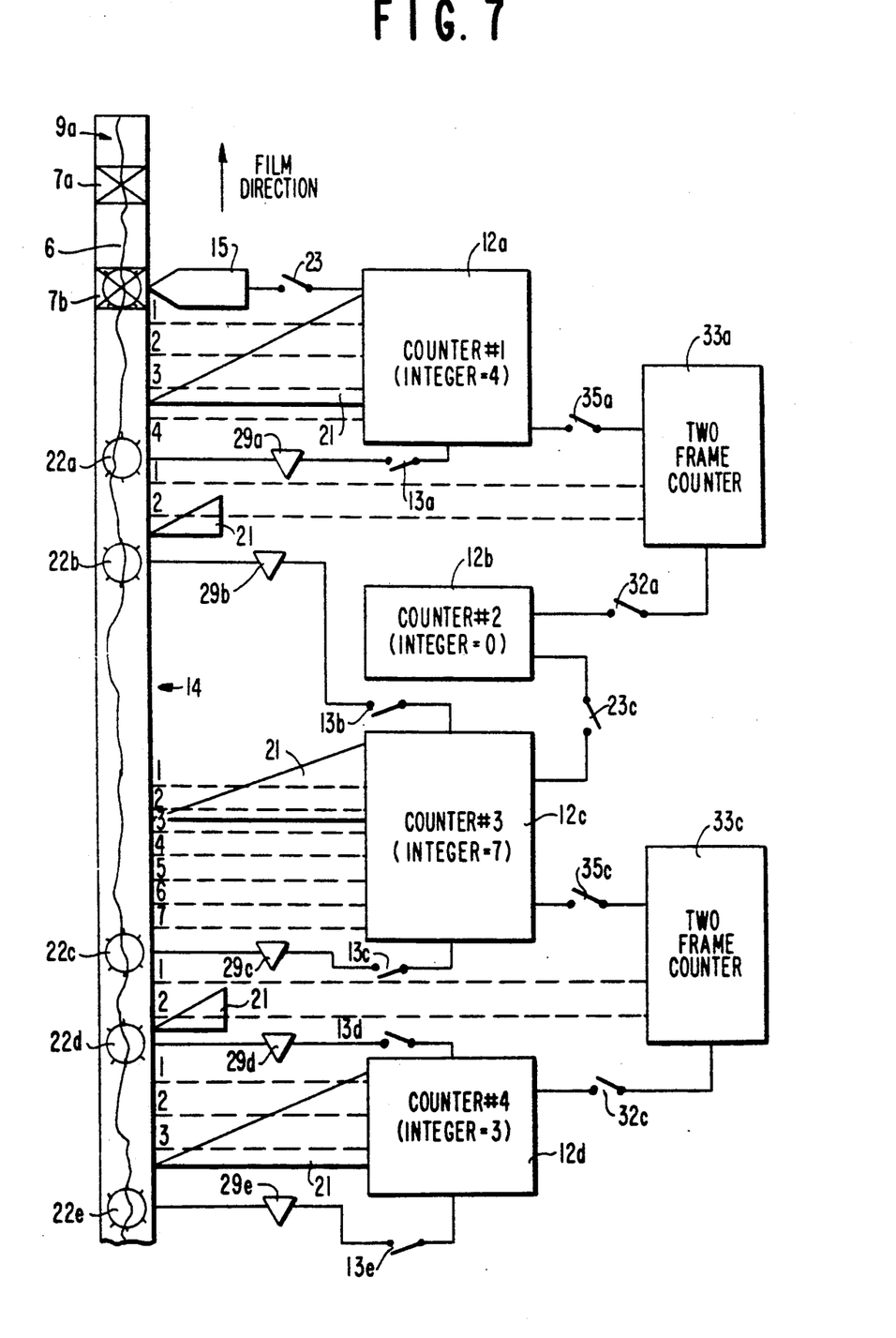
FIG. 7 shows a system and the steps taken to greatly reduce the time necessary to encode the identification number.

The following describes a means which reduces the time for each number to be encoded to a maximum of 11 frames (or other interval). FIG. 7 shows a means of reducing the counting time. For example, using four digits (highest number=9999) would have a counting time of 44 frames.

The preset number (in this example: 4073) is placed in the counters which will accept one integer each. The resultant display is: counter 1 reads 4; counter 2 reads zero; counter 3 reads 7; and counter 4 reads 3. (Prior to encoding, the negative would have had placed in its sound track the three 26 Hz bursts as shown in FIG. 2), which illustrates the condition of the negative prior to the start of a print run.

The encoding procedure is as follows: When the 26 Hz burst, 7b (integer beginning mark). Which is either embedded in the optical sound track (new film) or caused by the modulated output of the lamp filament (existing film) (FIG. 6), passes by the detector, 15, contact 23 is closed, turning on counter #1, 12a, which proceeds to count the next 4 frames by means of frame reader, 21, at which point (preset number 4) counter #1, 12a, turns itself off and turns on the (two) frame counter, 33a, by means of switch, 35a,. At the same time it turns on light marker system, 29a, by means of contact, 13a, which produces marker, 22a (integer ending mark and integer separator mark). The (two) frame counter, 33a, reads 2 frames by means of frame reader 21,. At count number 2 it turns itself off by means of switch, 32a, and turns on both counter #2 and light marker system, 29b(integer separator ending mark and integer beginning mark), by means of contact, 13b, which produces the marker, 22b,. (Counter #2, because it is preset at zero, acts like a direct connection to counter, 3, and closes contact, 23c, which turns on counter, 3,). Counter 3 counts the next 7 (preset number) frames by means of frame reader, 21, upon which action it simultaneously turns itself off and turns on the (two) frame counter, 33c, by means of contact 35c and by means of switch 13c, turns on marker system 29c (integer ending mark and integer separator beginning mark), which makes marker 22c. The 2 frame ouunter, 33c, by means of reader 21, counts two frames and simultaneously shuts itself off and turns on counter, 4, by means of contact, 32c,; light marker system, 29d, by means of contact, 13d, and makes marker, 22d, (integer separator ending mark and integer beginning mark)). Counter#4 counts the next 3 (preset # ) frames by means of reader, 21, and simultaneously shuts itself off; turns on light marker system, 29e, by means of contact, 13e, and makes end light marker, 22e(integer ending mark), thus effecting the completion of this portion of the process. The change in direction (either stop or reversal) will increase the last digit by the progression value of one as described in FIG. 6.

Because of the short time necessary to encode, it is more desirable to encode in the forward direction only. If the film is an existing film., using modulated lamp filament markers, the process can be stopped and the film rewound after the last preset integer is counted. This usually saves a great amount of time. With a new film using magnetic tape sound track to optical sound track transfer, it is necessary to complete the forward run since this is necessary anyway in order to get the full sound track transferred.

Figure 8:
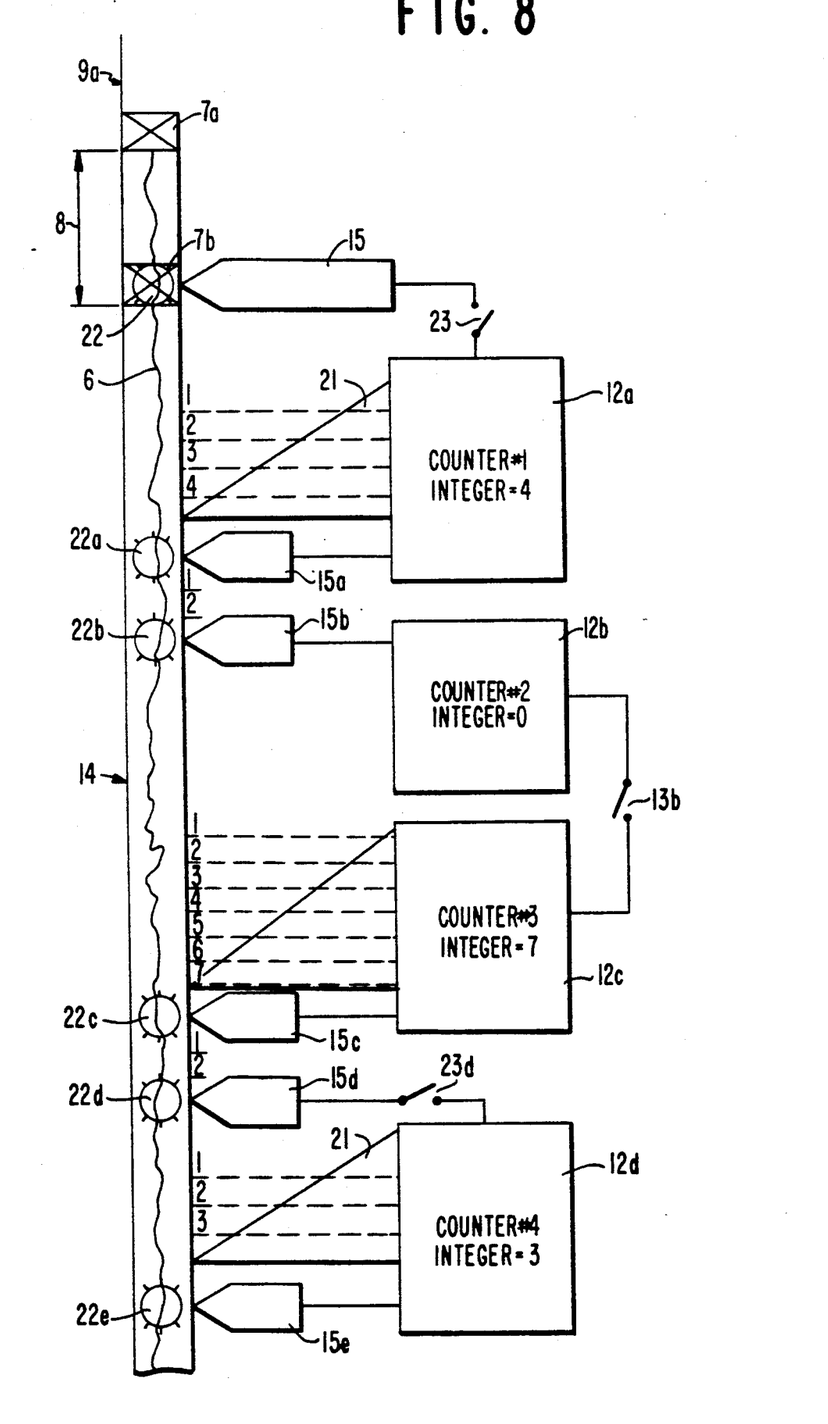
FIG. 8 shows a system for decoding the encoding of the identification number implanted by the system shown in 7. The 26 Hz signals at the location markers are extracted from the total audio content by means of the system shown in FIG. 3.

FIG. 8 Illustrates the means by which the identification number placed by the fast method of encoding (see FIG. 7) is decoded. As the negative film moves the preplaced 26 Hz burst (7b) (see FIG. 1) past detector (15), the 26 Hz signal (see FIG. 3) causes contact (23) to close; thus starting counter #1 (12a) which counts the number of frames passing until marker (22a) (integer identification mark) (placed at this location by fast encoder) (FIG. 7) is reached. Detector (15a) detects the 26 Hz at marker (22a) and shuts off counter #1. In this example, counter #1 counts up to 4 (seen on display) and is stopped by marker (22a). Similarly, after two frames have passed, (which basically serve as a spacer) marker (22b), through detector (15b) causes counter #3 to start because counter #2, having zero frames, effectively connects directly to counter #3 input by means of contact (13b). Counter #3 counts seven frames by means of frame reader (21), until marker (22c) (integer identification mark) is reached; thereupon detector (15c) turns off counter #3. As above, marker (22d) turns on counter #4 by means of detector (15d) and contact (23d). Marker (22e) (integer identification mark) is located at the third frame at which counter #4 is caused to stop after three frames (display). The counter displays read 4073 which is the identification number of the film.

Figure 9:
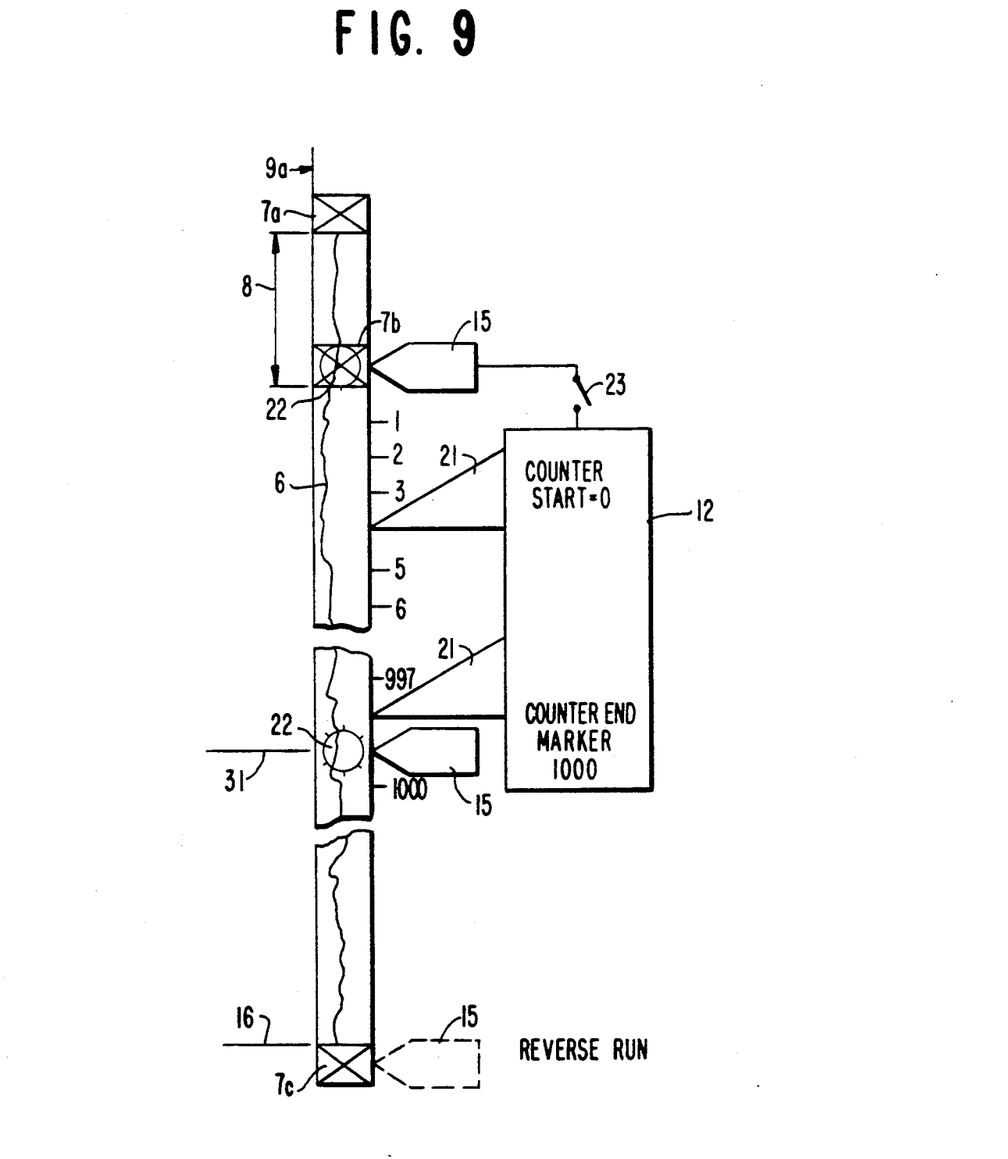
FIG. 9 shows a system for decoding the encoding of the identification number by means of the preferred embodiment system as shown in FIG. 6. The 26 Hz signals are extracted from the total audio content by the means shown in FIG. 3.

FIG. 9 Illustrates the means by which the identification number placed by the preferred embodiment (FIG. 6) is decoded. As the negative film moves the preplaced 26 Hz burst (7b) past detector (15), the 26 Hz signal (see FIG. 3) causes contact (23) to close, thus starting the counter. The counter counts the number of frames passing it (by means of frame reader (21) until the second marker (identification mark) is reached at which time the 26 Hz signal is detected by (15), which causes the counter to stop counting at the number of frames passed—1000—. The counter display will show 1000 which is the identification number of the film. In the reverse direction, the 26 Hz burst (7c) is detected by detector (15) which starts the counter counting down until the new preset marker 1001 is reached. At this point the counting is stopped and the display reads 1001(X-1). This is the identification number of the film.

FIG. 10 shows the characteristics of the human ear relating to 26 Hz as well as typical response curves of filters that may be used in connection with this invention. As seen the sensitivity of the human ear at a zero Db level, at 26 Hz is minus 62 Db below the sensitivity of the human ear at 1000 Hz.

Figure 11:
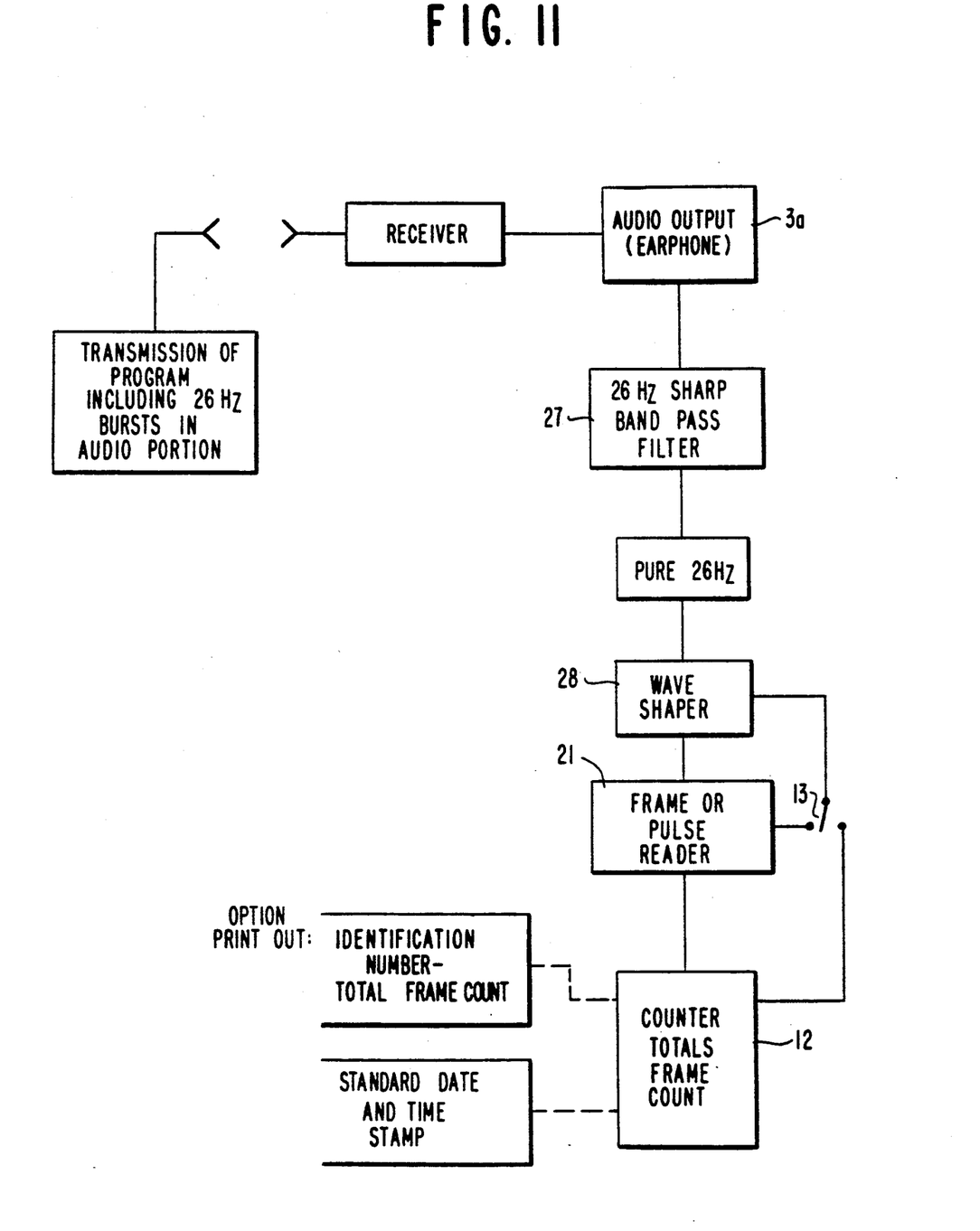
FIG. 11 shows a system for decoding broadcast programs.

FIG. 11 Illustrates a means by which over the air broadcasts (radio, TV and cable, etc.) can use this invention to detect and identify programs, commercials, music, etc. In the case of radio broadcasts the audio represents the total program. The program will contain the 26 Hz bursts, unheard (FIG. 10) and the decoding for the identification number is the same as described in FIG. 9. In the case of video broadcasts, the receiver will separate the audio from the video. The audio output at a point of the output of the audio transformer (as is the case with an earphone jack, which can be used directly). The procedure is then the same as for radio as described above.

Figure 12A:
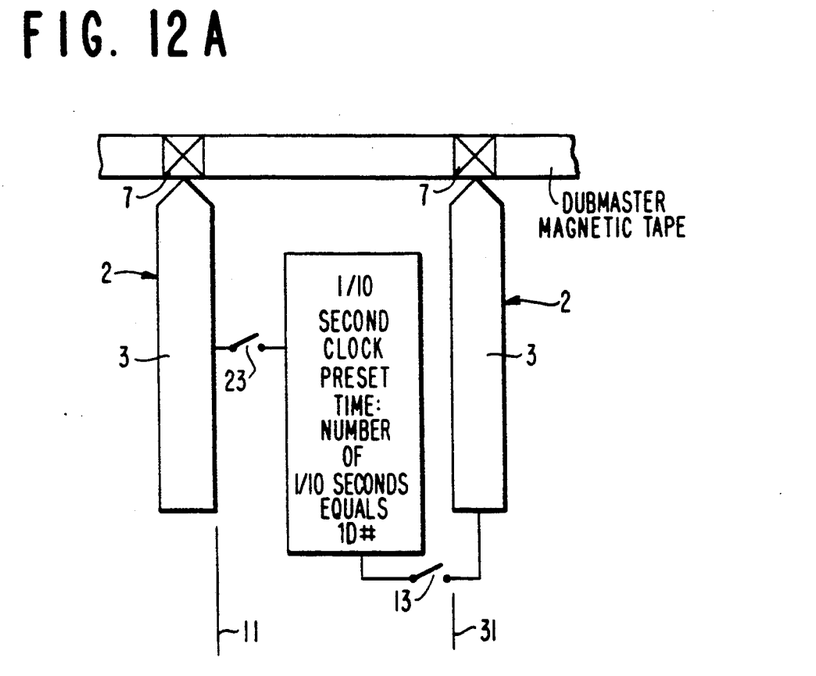
FIGS. 12A and 12B show a system for decoding the identification number of records such as played on juke boxes.
Figure 12B:
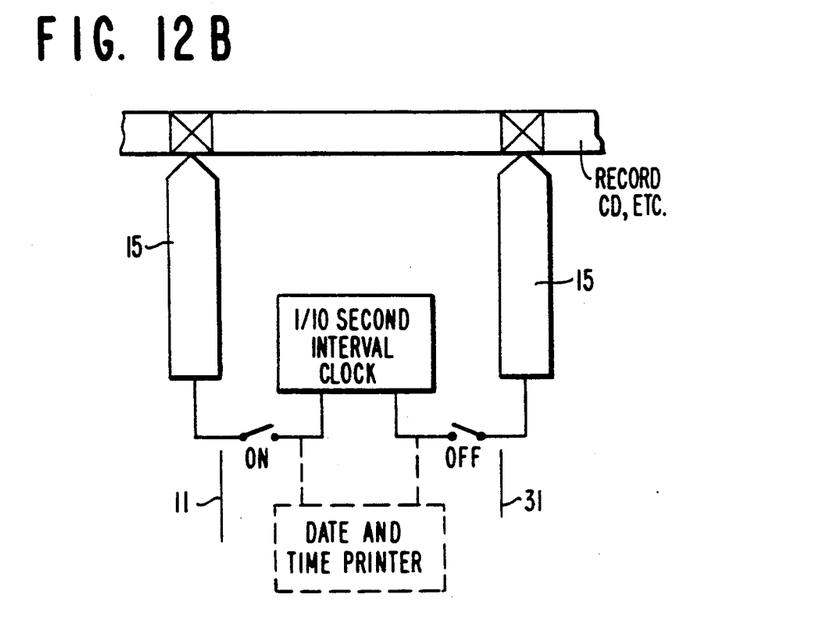

FIG. 12 Illustrates a means by which this invention can be used to determine the number of times a music piece is played on juke boxes as well as gathering other data. The identification number of the material is placed into the audio as described in the encoding procedure of FIG. 6. In this case, the intervals that could be used are 1/10 second intervals instead of frames for films. The number of 1/10 second intervals is the identification number. For example: if the identification number is 1234 then the interval between the start marker and the end marker is 1234 1/10 second intervals. The decoding is accomplished as follows: When the record, compact disc, tape, etc. is played, a detector (15) will detect the start marker and start a 1/10 second clock. The second marker, when detected by (15) stops the clock. The number of 1/10 second intervals on the clock is the identification number of the piece.

While my above description contains many specifications, these should not be construed as limitations of the scope of the invention, but rather as an exemplification of one preferred embodiment thereof.

Many other variations are possible. For example:
Other means of counting intervals:
Counting sine waves
Counting half sine waves
Counting cross-overs (changes from positive to negative and negative to positive as the sine wave crosses the zero line)
Counting perforations Accordingly, the scope of the invention should be determined not by the embodiments illustrated, but by the appended claims and their legal equivalents inserting selected distinguishable signals between beginning and ending marks permitting a bar code type of data.

What is claimed is:

1. The method of placing unique identification marks on each of plural, otherwise identical copies of an extended information carrier, said method comprising the following steps:
    (a) placing beginning and ending marks on a first copy, said beginning and ending marks being separated by a selected number of interval units;
    (b) placing an identification mark on said first copy; said identification mark being the numerical number of said interval units between said beginning and ending marks;
    (c) on successive copies after said first copy, placing beginning and ending marks on each said successive copy, said beginning and ending marks being separated by a number of interval units that is different from that used in any preceding copy; and
    (d) placing an identification mark on each successive copy; said identification mark on a given copy being equal to the numerical number of said interval units between the beginning and ending marks on said given copy.

2. The method of claim 1 comprising a means whereby the placement on said extended information carrier and the number of interval units between beginning and ending marks are automatically caused to change each time the direction of movement of the said extended information carrier is reversed; the number of interval units between said beginning and ending marks being different from that used in any preceding placement.

3. The method in claim 1 comprising a means of forming a beginning and an ending mark on film by means of modulating said projector lamp filament voltage at a sub audio frequency.

4. A method of detecting, decoding, by means of a frame reader and a counter with a display readout, and displaying unique identification marks placed on an extended information carrier as in claim 1, said method comprising the following steps:
    (a) moving the said extended information carrier, causing said beginning mark, placed on said extended information carrier as in claim 1, to move past said detector apparatus, said detector apparatus being responsive to a change in its input caused by the movement of the said beginning mark past the said detector apparatus;
    (b) causing said detector apparatus to effect said counter contact closure, thereby turning on said counter;
    (c) causing said counter, by means of said frame reader, to count those interval units, placed on said extended information carrier as in claim 1, which move past the said detector apparatus;
    (d) moving the said extended information carrier, causing said ending mark, placed on said extended information carrier as in claim 1, to move past the said detector apparatus, said detector apparatus being responsive to a change in its input caused by the movement of the said ending mark past the said detector apparatus;
    (e) opening said counter contact closure by said detector apparatus; and
    (f) causing said counter to stop counting and show on its said readout a display of the number of interval units counted; said number of interval units being the identification mark.

5. The method of placing unique identification marks on each of plural, otherwise identical copies of an extended information carrier, said method comprising the following steps:
    (a) placing integer beginning and ending marks on a first copy, said integer beginning and ending marks being separated by a selected number of interval units; said selected number of interval units being an integer with a value from 0 through 9 inclusive;
    (b) placing integer separator beginning and ending marks on a first copy, said integer separator beginning and ending marks being separated by a selected number of interval units;
    (c) placing an integer identification mark on said first copy, said integer identification mark being the numerical number of said integer interval units between said integer beginning and ending marks;
    (d) placing an integer separator mark on said first copy, said integer separator mark being the numerical number of said interval units between integer separator beginning and ending marks; said selected numerical number being equivalent to blank portions on said extended information carrier; interposing said blank portions between successive said integer identification marks; said blank portions being devoid of identification marks;
    (e) placing on said first copy additional said integer separation beginning and ending marks interposed between said additional integer beginning and ending marks;
    (f) assembling of said integers; said assemblage being the said unique identification mark; said unique identification mark being different from that used in any preceding copy;
    (g) on successive copies after said first copy, placing integer beginning and ending markers on each said successive copy, said integer beginning and ending marks being separated by a number of integer interval units that is different from that used in any preceding copy;
    (h) placing an integer identification mark on each said successive copy; said integer identification mark on a given copy being equal to the said selected number of integer interval units between said integer beginning and ending marks;
    (i) assembling successive integer identification marks; said assemblage being the successive said unique identification mark; said successive unique identification mark being different from that used in any preceding copy.

6. A method of detecting, decoding, by means of a frame reader and an integer counter with a display readout, and displaying unique identification marks placed on an extended information carrier as in claim 5, said method comprising the following steps:

(a) moving the said extended information carrier, causing said integer beginning mark, placed on said extended information carrier as in claim 1, to move past said detector apparatus, said detector apparatus being responsive to a change in its input caused by the movement of the said integer beginning mark past the said detector apparatus;

(b) causing said detector apparatus to effect said integer counter contact closure, thereby turning on said integer counter, said integer counter having a counting and display capability limited to a range from 0-9;

(c) causing said integer counter, by means of said frame reader, to count those interval units, placed on said extended information carrier as in claim 1, which move past the said detector apparatus;

(d) moving the said extended information carrier, causing said integer ending mark, placed on said extended information carrier as in claim 1, to move past the said detector apparatus, said detector apparatus being responsive to a change in input caused by the movement of the said integer ending mark past the said detector apparatus;

(e) causing said detector apparatus to open said integer counter contact closure;

(f) causing said integer counter to stop counting and display the number of interval units counted; said number of interval units being one integer of the identification mark;

(g) counting successive numbers of interval units between said integer beginning and ending marks, placed on said extended information carrier as in claim 1, in a manner identical to that described above; each said integer counter displaying one integer of the identification mark from 0-9; and (h) the assemblage of said successive integer displays being the identification mark.

7. The method of placing unique identification marks on each of plural, otherwise identical copies of an extended information carrier, said method comprising the following steps:

(a) placing bar code beginning and ending marks on a first copy, said bar code beginning and ending marks being separated by selected signals comprising distinguishable types of signals;

(b) placing a bar code identification mark on said first copy, said bar code identification mark being the said selected signals between said bar code beginning and ending marks;

(c) on successive copies after said first copy placing bar code beginning and ending marks on each said successive copy, said bar code beginning and ending marks being separated by selected signals that are different from that used in any preceding copy; and (d) placing a bar code identification mark on each said successive copy; said bar code identification mark on a given copy being equal to the said selected signals between the beginning and ending marks on said given copy.

8. A method of detecting, decoding, by means of a bar code reader and a bar code counter with a display readout, and displaying unique identification marks placed on an extended information carrier as in claim 7, said method comprising the following steps:

(a) moving the said extended information carrier, causing said bar code beginning mark, placed on said extended information carrier as in claim 7, to move past said bar code detector apparatus, said bar code detector apparatus being responsive to a change in its input caused by the movement of the said bar code beginning mark past the said bar code detector apparatus;

(b) causing said bar code detector apparatus to effect said bar code counter contact closure, thereby turning on said bar code counter;

(c) causing said bar code reader to recognize those interval units, by means of reading the said selected distinguishable signals, placed on said extended information carrier as in claim 7, which move past the said bar code reader, said recognition information being fed to said bar code counter causing said bar code counter to count the said interval units;

(d) moving the said extended information carrier, causing said bar code ending mark, placed on said extended information carrier as in claim 7, to move past the said bar code detector apparatus, said bar code detector apparatus being responsive to a change in input caused by the movement of the said bar code ending mark past the said bar code detector apparatus;

(e) causing said bar code detector apparatus to open said bar code counter contact closure; and (f) causing said bar code counter to stop counting and causing said bar code counter readout to display the number of interval units counted; said number of interval units being the identification mark.

* * * * *